US006913360B2

(12) United States Patent
Cho et al.

(10) Patent No.: US 6,913,360 B2
(45) Date of Patent: Jul. 5, 2005

(54) SINGLE-PANEL COLOR IMAGE DISPLAY APPARATUS

(75) Inventors: Kun-ho Cho, Gyeonggi-do (KR); Dae-sik Kim, Gyeonggi-do (KR); Sung-ha Kim, Gyeonggi-do (KR); Hee-joong Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/637,000

(22) Filed: Aug. 8, 2003

(65) Prior Publication Data

US 2004/0057018 A1 Mar. 25, 2004

(30) Foreign Application Priority Data

Aug. 31, 2002 (KR) ................................ 10-2002-0052285

(51) Int. Cl.[7] ................................................ G03B 21/14
(52) U.S. Cl. ............................ 353/31; 353/84; 348/743
(58) Field of Search .............................. 353/31, 33, 34, 353/37, 84; 349/5, 7, 8; 348/742, 743, 771

(56) References Cited

U.S. PATENT DOCUMENTS 5,845,981 A * 12/1998 Bradley ....................... 353/31
5,897,190 A * 4/1999 Takahashi .................... 353/31
2004/0066494 A1 * 4/2004 Lee et al. ...................... 353/31
2004/0085486 A1 * 5/2004 Katoh et al. .................... 349/5
2004/0105077 A1 * 6/2004 Kim et al. ..................... 353/31
2004/0114112 A1 * 6/2004 Kim et al. ..................... 353/31

* cited by examiner

*Primary Examiner*—William C. Dowling
(74) *Attorney, Agent, or Firm*—Staas & Halsey LLP

(57) ABSTRACT

A single-panel color image display apparatus realizing a wide color gamut includes a light source, a colored light separator, and a light valve. The colored light separator has four or more dichroic filters of reflective type which separate a light emitted from the light source according to a wavelength. The light valve controls the light that is emitted from the light source and separated by the colored light separator according to color, on a pixel-by-pixel basis according to an input image signal, and forms a color image. By performing color scrolling using a scrolling unit having a spiral array of lens cells, the same resolution as that obtained when using a color wheel can be realized and the same light efficiency as that obtained when using a three-panel color image display apparatus can be realized.

14 Claims, 6 Drawing Sheets

SINGLE-PANEL COLOR IMAGE DISPLAY APPARATUS

CROSS-REFERENCE TO RELATED APPLICATIONS

This application claims the priority of Korean Patent Application No. 2002-52285, filed on Aug. 31, 2002, in the Korean Intellectual Property Office, the disclosure of which is incorporated herein in its entirety by reference.

BACKGROUND OF THE INVENTION

1. Field of the Invention

The present invention relates to a single-panel projection color image display apparatus, and more particularly, to a single-panel color image display apparatus having a wide color gamut and/or a high light efficiency.

2. Description of the Related Art

Color image display apparatuses of a projection type form an image by controlling a light emitted from a high-output lamp light source on a pixel-by-pixel basis using a light valve such as a liquid crystal display (LCD) or a digital micro device (DMD), and magnify and project the image using a projection optical system, thereby providing a wide screen. The color image display apparatuses of the projection type are classified into three-panel type and single-panel type according to a number of light valves.

In a general single-panel color image display apparatus, the white light irradiated from the lamp light source is separated into red, green, and blue color light beams using a color wheel, and the three colored light beams are sequentially sent to one light valve. The light valve operates according to a sequence of colors received and forms the image.

As described above, the general single-panel color image display apparatus has a simpler structure and a smaller optical system than a three-panel color image display apparatus, which forms each of the color images on three light valves using an optical separation/combination system. However, the general single-panel color image display apparatus has a light efficiency equal to ⅓ of that of the three-panel color image display apparatus due to a use of the color wheel. Hence, the single-panel color image display apparatus which includes a colored light separator having three dichroic filters and has the same light efficiency as that of a three-panel color image display apparatus has been proposed.

Referring to FIGS. 1 and 2, a conventional single-panel color image display apparatus having a dichroic filter type colored light separator includes a lamp light source 1 emitting white light, three dichroic filters 4R, 4G, and 4B which are disposed aslant with respect to one another, a micro lens array 10, and a liquid crystal display device 20.

The lamp light source 1 emits a white light in a divergent light form. The white light emitted from the lamp light source 1 is converted into a parallel light using a condenser lens 3.

The light emitted from the lamp light source 1 is separated into a red light beam R, a green light beam G, and a blue light beam B by the three dichroic filters 4R, 4G, and 4B. The dichroic filter 4R reflects the red light beam R from white light emitted from the light source 1 and transmits the remaining light beams. The dichroic filter 4G reflects the green light beam G from the remaining light beams passing through the dichroic filter 4R and transmits the remaining light beam, that is, the blue light beam B. The dichroic filter 4B reflects the blue light beam B.

Each of the three dichroic filters 4R, 4G and 4B is disposed aslant at an angle of $+\theta$ to one another. In other words, the dichroic filter 4R is disposed aslant at an angle of $-\theta$ with respect to the dichroic filter 4G, and the dichroic filter 4B is disposed aslant at an angle of $+\theta$ with respect to the dichroic filter 4G. Here, "+" indicates a counterclockwise direction, and "−" indicates a clockwise direction.

Accordingly, a chief ray of the red light beam R is incident on the micro lens array 10 at an angle of $-\theta$ with respect to a chief ray of the green light beam G, and a chief ray of the blue light beam B is incident on the micro lens array 10 at an angle of $+\theta$ with respect to the chief ray of the green light beam G.

The micro lens array 10 is formed by arranging a plurality of cylindrical lenses which form unit micro lenses 10*a* in a horizontal direction. The micro lens array 10 condenses the R, G, and B colored light beams, which are incident at different angles, on signal electrodes 21R, 21G, and 21B, respectively, of the liquid crystal display device 20 in a striped pattern.

The liquid crystal display device 20 has a structure in which a liquid crystal layer 23 is sandwiched between two transparent glass substrates 24 and 25. Transparent conductive films 22 and the signal electrodes 21R, 21G, and 21B are formed on both sides of the liquid crystal layer 23 in a matrix structure.

In the conventional single-panel color image display apparatus having the above structure, the R, G and B color bars, which are obtained by separating the white light into the three primary colors using the three dichroic filters 4R, 4G, and 4B and condensed on the signal electrodes 21R, 21G, and 21B of the liquid crystal display device 20, are arranged at constant intervals in the horizontal direction due to differences in the incident angles of the chief rays of the R, G, and B colored light beams, and correspond to the signal electrodes 21R, 21G, and 21B for the R, G, and B colored light beams. The R, G, and B signal electrodes 21R, 21G, and 21B are subpixels and constitute a single image pixel.

When three subpixels corresponding to three primary colors, that is, R, G, and B colors correspond to the unit micro lenses 10*a* and the three subpixels form the image on a screen 7 by a field lens 5 and a projection lens 6, a set of the three subpixels appears as a single image pixel.

As can be seen from FIG. 5 to be described below, when the three dichroic filters 4R, 4G, and 4B are used as the colored light separator, a reproducible color gamut is much narrower than a color gamut which can be recognized by a human eye. A color gamut indicates a range of reproducible chromaticity. Thus, a narrow color gamut is where a number of reproducible colors is few.

Accordingly, it is difficult to obtain a sufficiently wide color gamut from the dichroic filters 4R, 4G, and 4B of the conventional single-panel color image display apparatus.

Further, because the three subpixels constitute the single image pixel in the conventional single-panel color image display apparatus, the resolution of the liquid crystal display device 20 is reduced to ⅓. Accordingly, in order to realize the same resolution as the single-panel color image display apparatuses using the color wheel, a physical resolution of the liquid crystal display device 20 must be increased three times.

SUMMARY OF THE INVENTION

According to an aspect of the present invention, there is provided a single-panel color image display apparatus that can realize a wide color gamut.

According to an aspect of the present invention, there is provided a single-panel color image display apparatus that can achieve a wide color gamut, and has a same resolution as that obtained when using a color wheel due to a scrolling operation of a scrolling unit, and a same light efficiency as that obtained when using a three-panel color image display apparatus.

According to an aspect of the present invention, there is provided a single-panel color image display apparatus including a light source emitting a light; four dichroic filters of a reflective type; a colored light separator including the four dichroic filters to separate the light according to a wavelength; and a light valve controlling the light on a pixel-by-pixel basis according to an input image signal and forming a color image.

The dichroic filters reflect a red light beam, a green light beam, a cyan light beam, and a blue light beam.

Further, the colored light separator may include five dichroic filters which reflect a red light beam, a yellow light beam, a green light beam, a cyan light beam, and a blue light beam, respectively.

According to an aspect of the present invention, a dichroic filter reflecting a red light beam is disposed last among the dichroic filters of the colored light separator.

According to an aspect of the present invention, the single-panel color image display apparatus further includes a scrolling unit formed by spirally arranging an array of lens cells to obtain an effect of a linear motion of a lens array due to a rotation of the spiral array of the lens cells to perform a scrolling operation.

According to an aspect of the present invention, the single-panel color image display apparatus further includes first and second fly eye lenses, disposed between the scrolling unit and the light valve, sending the light passing through the scrolling unit to match the lens cells of the scrolling unit in a one-to-one correspondence.

According to an aspect of the present invention, the single-panel color image display apparatus further includes a relay lens, disposed between the second fly eye lens and the light valve, condensing a light beam passing through the second fly eye lens on the light valve according to color.

According to an aspect of the present invention, the single-panel color image display apparatus further includes first and second cylinder lenses, disposed in front and behind of the scrolling unit, respectively, adjusting a width of the light incident on the scrolling unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects of the present invention, taken in conjunction with the accompanying drawings of which.

DETAILED DESCRIPTION OF THE INVENTION

Figure 1:
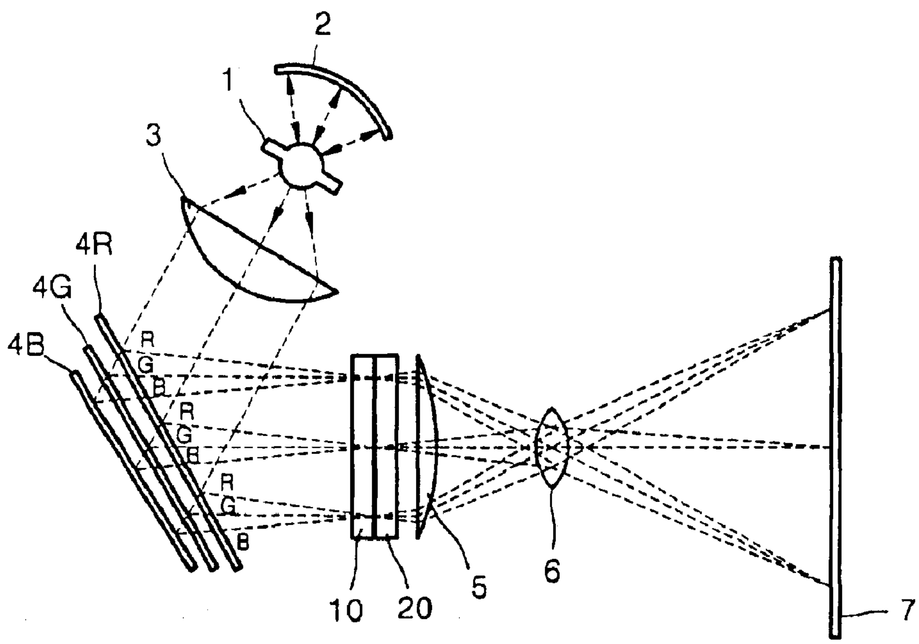
FIG. 1 shows a conventional single-panel color image display apparatus including a colored light separator having three dichroic filters.
Figure 2:
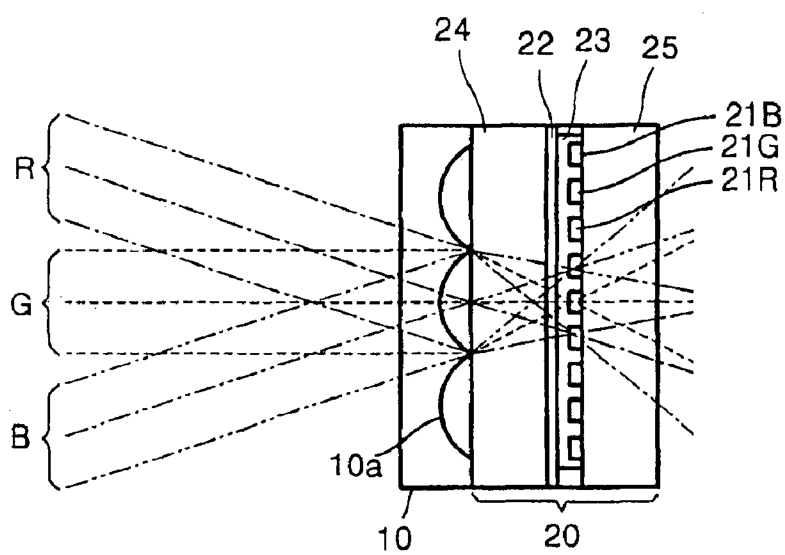
FIG. 2 shows an optical path of light rays in a micro lens array and a liquid crystal display device for the conventional single-panel color image display apparatus of FIG. 1.

Reference will now be made in detail to the aspects of the present invention, examples of which are illustrated in the accompanying drawings, wherein like reference numerals refer to like elements throughout. The aspects are described below in order to explain the present invention by referring to the figures.

Figure 3:
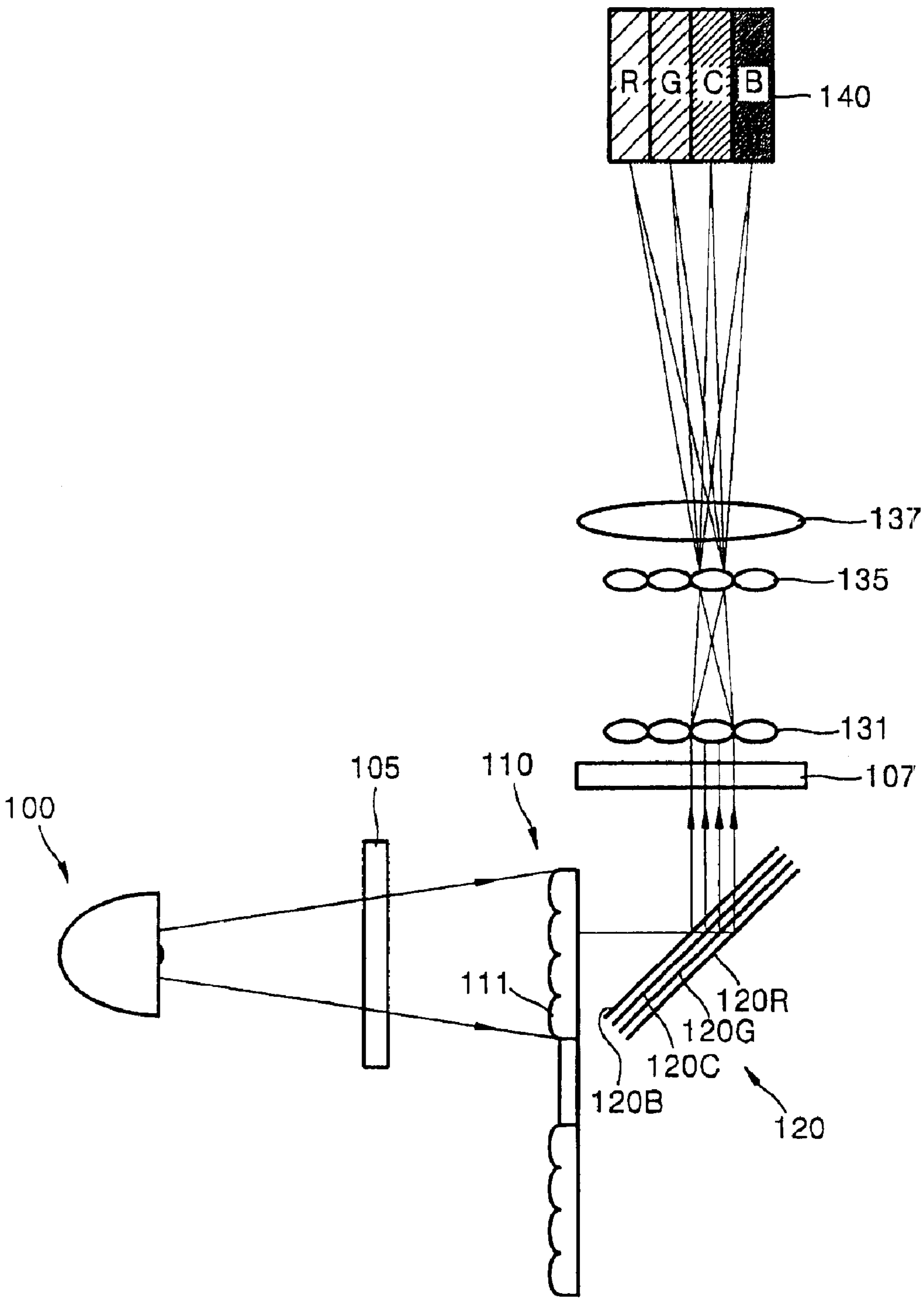
FIG. 3 is a schematic structure diagram of a single-panel color image display apparatus, according to a first aspect of the present invention.
Figure 4:
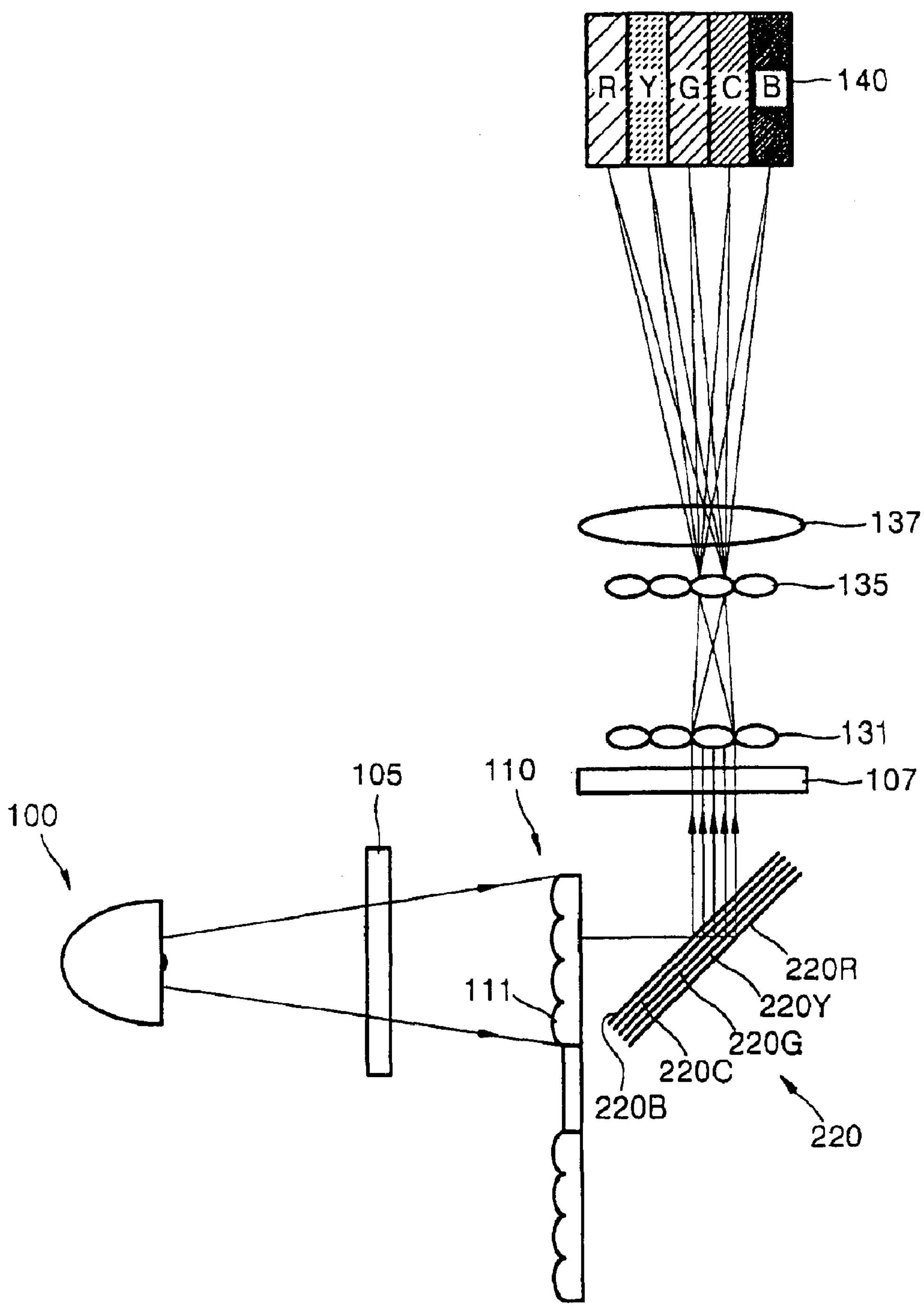
FIG. 4 is a schematic structure diagram of the single-panel color image display apparatus, according to a second aspect of the present invention.

Referring to FIGS. 3 and 4, a single-panel color image display apparatus, according to an aspect of the present invention, includes a light source 100, colored light separators 120 and 220 which separates a light emitted from the light source 100 according to color, and a light valve 140 which controls the light on a pixel-by-pixel basis according to an input image signal and forms a color image.

The light source 100 may include a lamp light source to emit a white light.

The colored light separators 120 and 220 include four or more dichroic filters of a reflective type to separate the light emitted from the light source 100 according to a wavelength. One of the dichroic filters reflecting a red light beam R may be disposed at a position last among the four or more dichroic filters.

As shown in FIG. 3, the colored light separator 120 includes the dichroic filters in a predetermined order, such as first, second, third, and fourth dichroic filters 120B, 120C, 120G, and 120R to reflect a blue light beam B, a cyan light beam C, a green light beam G, and the red light beam R, respectively. The first, second, third, and fourth dichroic filters 120B, 120C, 120G, and 120R separate the white light emitted from the light source 100 into the blue light beam B, the cyan light beam C, the green light beam G, and the red light beam R.

The first, second, third, and fourth dichroic filters 120B, 120C, 120G, and 120R may reflect the blue light beam B, the cyan light beam C, the green light beam G, and the red light beam R, respectively, and transmit other colored light beams.

When the white light emitted from the light source 100 is incident on the colored light separator 120 having the first, second, third, and fourth dichroic filters 120B, 120C, 120G, and 120R arranged as presented above, the first dichroic filter 120B reflects the blue light beam B from the white incident light and transmits the remaining light beams. The second dichroic filter 120C reflects the cyan light beam C from the light beams transmitted by the first dichroic filter 120B and transmits the remaining light beams. The third dichroic filter 120G reflects the green light beam G from the light beams transmitted by the second dichroic filter 120C and transmits the remaining light beam, that is, the red light beam R. The fourth dichroic filter 120R reflects the red light beam R transmitted by the third dichroic filter 120G.

Here, the first, second, third, and fourth dichroic filters 120B, 120C, 120G, and 120R may be arranged in various orders.

A distance between the first, second, third, and fourth dichroic filters 120B, 120C, 120G, and 120R may be set such that the blue light beam B, the cyan light beam C, the green light beam G, and the red light beam R separated by the colored light separator 120 are incident on a same lens cell of a first fly eye lens 131, to be described below, without a color mixture of the B, C, G, and R colored light beams.

In FIG. 3, the first, second, third, and fourth dichroic filters 120B, 120C, 120G, and 120R are disposed to be parallel to one another, or the first, second, third, and fourth dichroic filters 120B, 120C, 120G, and 120R may be disposed aslant with respect to one another.

As shown in FIG. 4, the colored light separator 220 includes five dichroic filters 220B, 220C, 220G, 220Y, and 120R to reflect the blue light beam B, the cyan light beam C, the green light beam G, a yellow light beam Y, and the red light beam R, respectively. The five dichroic filters 220B, 220C, 220G, 220Y, and 120R separate the white light emitted from the light source 100 into the blue light beam B, the cyan light beam C, the green light beam G, the yellow light beam Y, and the red light beam R, respectively.

The five dichroic filters 220B, 220C, 220G, 220Y, and 220R may reflect the blue light beam B, the cyan light beam C, the green light beam G, the yellow light beam Y, and the red light beam R, respectively, and transmit the other colored light beams, similarly to the four dichroic filters 120B, 120C, 120G, and 120R included in the colored light separator 120, according to the first aspect of the present invention. Here, the dichroic filter 220R reflecting the red light beam R may be disposed last among the five dichroic filters 220B, 220C, 220G, 220Y, and 220R.

A distance between the five dichroic filters 220B, 220C, 220G, 220Y, and 220R may be set such that the blue light beam B, the cyan light beam C, the green light beam G, the yellow light beam Y, and the red light beam R separated by the colored light separator 220 are incident on the same lens cell of the first fly eye lens 131 without the color mixture among the B, C, G, Y and R colored light beams.

In FIG. 4, the five dichroic filters 220B, 220C, 220G, 220Y, and 220R are disposed to be parallel to one another, or the five dichroic filters 220B, 220C, 220G, 220Y, and 220R may be disposed aslant with respect to one another.

Figure 5:
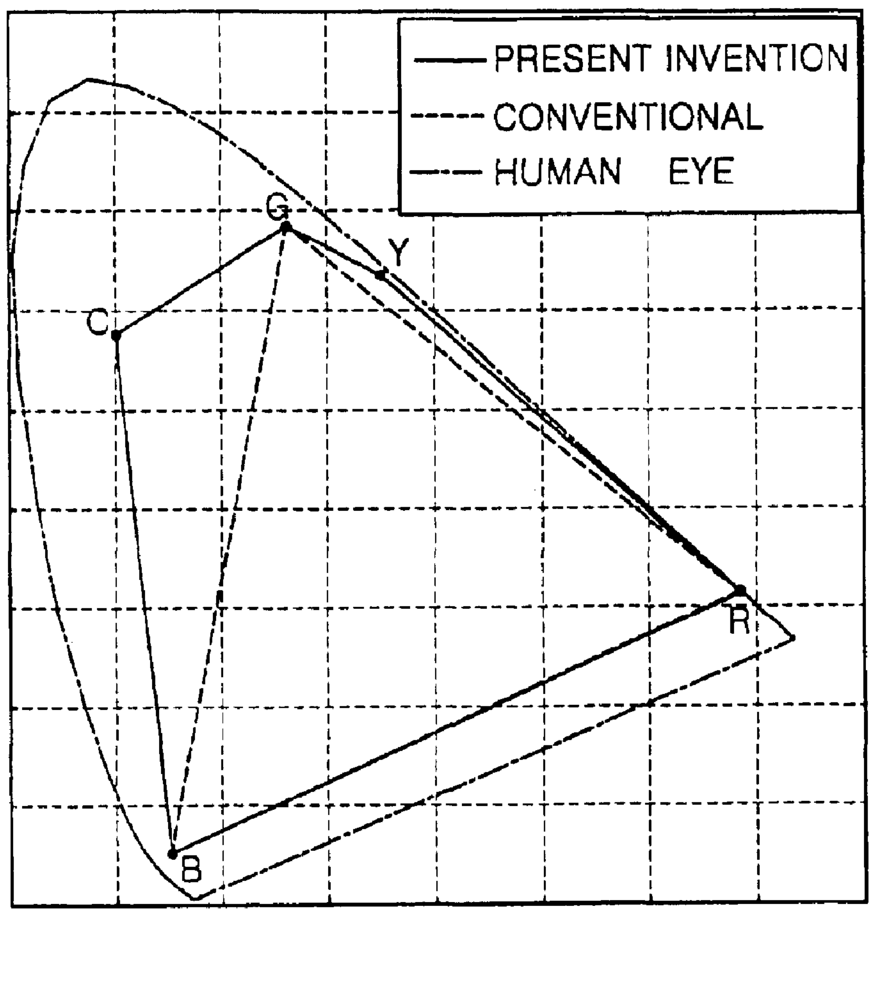
FIG. 5 shows color coordinates to illustrate a realizable color gamut of a colored light separator, according to an aspect of the present invention, the realizable color gamut that can be recognized by a human's eye, and the realizable color gamut of a conventional colored light separator.

FIG. 5 shows a realizable color gamut of the colored light separator, according to an aspect of the present invention which includes five dichroic filters to separate the white incident light into the blue light beam B, the cyan light beam C, the green light beam G, the yellow light beam Y, and the red light beam R, a color gamut that can be recognized by a human eye, and a realizable color gamut of a conventional colored light separator.

If the number of the dichroic filters included in the colored light separators 120 or 220, as in an aspect of the present invention, shown in FIGS. 3 and 4 is increased compared to the conventional colored light separator shown in FIG. 1, FIG. 5 shows that a realizable color gamut can be wide according to the number of added dichroic filters. Thus, the wide color gamut can be realized by the colored light separators 120 or 220, according to an aspect of the present invention. Here, the wide color gamut refers to a larger number of realizable colors.

Because the dichroic filter to reflect the red light beam R, as shown in FIGS. 3 and 4, is disposed last in the colored light separators 120 or 220, according to an aspect of the present invention, the wide color gamut can be obtained.

Here, a reason why the wide color gamut can be obtained when the dichroic filter to reflect the red light beam R is disposed last is as follows.

Referring to a spectroscopic feature of the lamp light source 100, an intensity of the green light beam G is the strongest and the intensity of the blue light beam B also is considerably strong, but the intensity of the red light beam R is relatively weak.

Thus, in a case where the dichroic filter to reflect the red light beam R is the first disposed among the plurality of dichroic filters, a considerable amount of the green light beam G, for example, together with the red light beam R are reflected by the dichroic filter to reflect the red light beam R so that a considerable amount of the green light beam G is mixed in the red light beam R.

Because the human eye is more sensitive to the green light beam G, a combination of the green light beam G and the red light beam R makes a proper color realization difficult. Thus, the color gamut to be displayed by a color image display apparatus becomes narrow.

However, when the dichroic filters are arranged to reflect the red light beam R last as in the colored light separators 120 or 220, according to an aspect of the present invention, other colored light beams of the green light beam G or the blue light beam B, etc., can be prevented from being mixed in the red light beam R. Thus, the color gamut is prevented from being narrow due to the color combination among the colored light beams. That is, a sufficiently wide color gamut can be realized in the single-panel color image display apparatus, according to an aspect of the present invention.

Accordingly, the single-panel color image display apparatus, according to an aspect of the present invention, can obtain the wide color gamut compared to the conventional single-panel color image display apparatus which uses three dichroic filters as the colored light separator. Also, the number of realizable colors is many.

In a case where the single-panel color image display apparatus uses a color scrolling operation, the single-panel color image display apparatus can have the same light efficiency as that of a three-panel color image display apparatus. Further, a resolution reduction generated in the conventional single-panel image display apparatus shown in FIG. 1 is solved.

In the color scrolling technique, the white light is separated into the plurality of colored light beams and the plurality of colored light beams are sent to different locations through a light valve, thereby forming a plurality of color bars. The color bars are moved at a constant speed in a particular method so that the color image can be formed by reaching all of the colored light beams for each pixel.

The single-panel color image display apparatus, according to an aspect of the present invention, may further include a scrolling unit 110 to perform the color scrolling. First and second fly eye lenses 131 and 135 may be further provided on an optical path between the scrolling unit 110 and the light valve 140. Further, a relay lens 137 may be further provided between the second fly eye lens 135 and the light valve 140.

Figure 6:
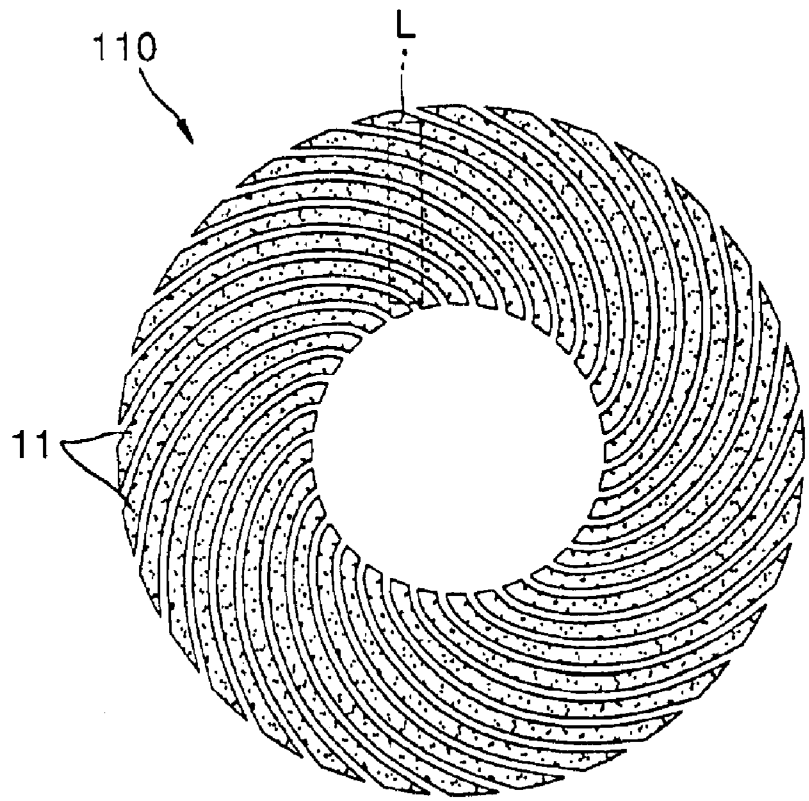
FIG. 6 is a schematic structure diagram of a scrolling unit used in the single-panel color image display apparatus, according to an aspect of the present invention.

The scrolling unit 110, as shown in FIG. 6, has a disc structure in which an array of lens cells 111 is spirally formed to obtain an effect of a linear motion of a lens array due to a rotation of the scrolling unit 110. The lens cells 111 may be formed at constant intervals, and cross-section shapes of the lens cells 111 may be the same to one another.

Figure 7:
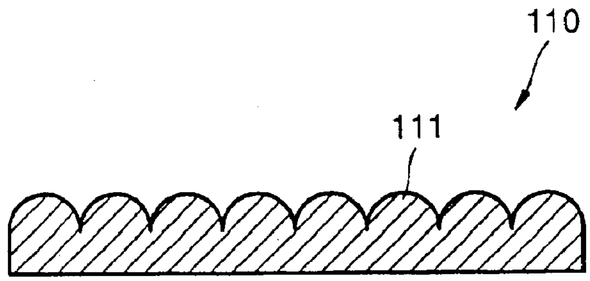
FIG. 7 is a cross-sectional view of one example of lens cells of the scrolling unit of FIG. 6.

For example, the lens cells 111 of the scrolling unit 110, as shown in FIG. 7 may be cylinder lens cells having cross-section shapes of an arc. Alternatively, the lens cells 111 of the scrolling unit 110 can be formed of either a diffractive optical element or a hologram optical element.

Each of lens cells 111 of the scrolling unit 110 operates as a condensing lens to condense the parallel light incident from the light source 100.

When the scrolling unit 110 having the spiral array of the lens cells 111 is rotatably driven using a motor, the rotation of the spiral array of the lens cells 111 has an effect of the linear motion of the lens array so that the scrolling operation is performed.

In other words, because the array of the lens cells 111 is formed spirally, if the scrolling unit 110 rotates at a constant speed, it can be seen from the viewpoint of a light beam L passing through a predetermined location of the scrolling unit 110 that an effect generated when the cylinder lens array continuously moves upward or downward at a constant speed is obtained. Here, if a width of the light beam L passing through the scrolling unit 110 is narrow, the effect of the light beam passing through the cylinder lens array that moves linearly can be obtained.

Accordingly, as the scrolling unit 110 rotates at a constant speed, the colored light beams separated by the colored light separators 120 or 220 are repeatedly scrolled so that the color bars are scrolled on the light valve 140.

At this time, in a case where the scrolling unit 110 is provided as described above, because the scrolling unit 110 continuously rotates in one direction without changing the rotation direction so that scrolling is performed, continuity and consistency of the color scrolling can be guaranteed. In addition, because the color bars are scrolled using a single scrolling unit 110, the scrolling speed of the color bars is advantageously kept constant.

Here, the number of scrolling unit cells 111 on the scrolling unit 110 or the rotation speed of the scrolling unit 110 can be controlled to synchronize the scrolling unit 110 with an operating frequency of the light valve 140.

For example, if the operating frequency of the light valve 140 is high, more lens cells 111 are included so that a scrolling speed can be controlled to be faster, while keeping the rotation speed of the scrolling unit 110 constant. Alternatively, the scrolling speed can be controlled to be faster by increasing the rotation frequency of the scrolling unit 110 without changing the number of scrolling unit cells 111.

Although the single-panel color image display apparatuses, according to an aspect of the present invention, shown in FIGS. 3 and 4 include the single scrolling unit 110, the single-panel color image display apparatuses may include the two scrolling units, as needed. In a case where the single-panel color image display apparatus includes two scrolling units, the two scrolling units are installed on the same driving axis so that color scrolling can be performed. Thus, the speed of the color scrolling can be kept constant.

In a case where the dichroic filters of the colored light separators 120 and 220 are disposed to be parallel to one another, the scrolling unit 110, as shown in FIGS. 3 and 4, is disposed between the light source 100 and the colored light separators 120 or 220 so that light condensed by the scrolling unit 110 is separated by the colored light separators 120 and 220. Here, the colored light beams are not combined with one another due to a difference in the lengths of optical paths of the colored light beams caused by the selective reflection of each of the dichroic filters, and may be incident on the first fly eye lens 131.

The dichroic filters of the colored light separators 120 or 220 may be disposed aslant with respect to one another and the scrolling unit 110 may be disposed between the colored light separators 120 or 220 and the light valve 140.

The lens cells of each of the first and second fly eye lenses 131 and 135 may match with each other in a one-to-one correspondence. Further, the lens cells of the first and second fly eye lenses 131 and 135 may match the lens cells 111 of the scrolling unit 110 in a one-to-one correspondence.

The first fly eye lens 131 may be disposed on a focal surface of the scrolling unit 110 in order to focus the colored light beams, which pass through the scrolling unit 110 and are separated by the colored light separators 120 or 220, without a color mixture among the colored light beams.

In this case, the colored light beams, which are condensed by the lens cells 111 of the scrolling unit 110, which is used as the condensing lens and separated by the dichroic filters of the colored light separators 120 and 220, have different lengths of associated optical paths due to the dichroic filters which are separated from one another, thereby focusing at different locations of the same lens cell of the first fly eye lens 131.

The colored light beams passing through the first fly eye lens 131 are converted in the divergent light form and are formed into the parallel light by the second fly eye lens 135.

The colored light beams in the parallel light form passing through the first and second fly eye lenses 131 and 135 form images at different locations on the light valve 140 by the relay lens 137, thereby forming the color bars according to the corresponding color. The relay lens 137 may be formed of single lens as shown in FIGS. 3 and 4, but the relay lens 137 may be formed of a lens group including two or more lenses.

In a case where the first and second fly eye lenses 131 and 135 and the relay lens 137 are provided, the colored light beams condensed on the scrolling unit 110 are sent by the first and second fly eye lenses 131 and 135 in a one-to-one correspondence and the color bars are formed on the light valve 140 by the relay lens 137.

The light valve 140 controls the colored light beams irradiated in a color bar form according to the input image signal, thereby forming the color image.

The color bars focused on the light valve 140, for example, the R, G, C, and B color bars or the R, Y, G, C, and B color bars are scrolled according to the rotation of the scrolling unit 110. Thus, the light valve 140 processes image information for each pixel to synchronize with the movement of the color bars, thereby forming the color image. The formed color image is magnified by a projecting lens (not shown) and lands on a screen (not shown).

The single-panel color image display apparatus, according to an aspect of the present invention, further includes first and second cylinder lenses 105 and 107 which are disposed in front and behind of the scrolling unit 110, respectively, to adjust a width of a light beam incident on the scrolling unit 110.

The first cylinder lens 105 reduces the width of the light beam emitted from the light source 100 so that the light beam with a reduced width is incident on the scrolling unit 110. The second cylinder lens 107 returns the reduced width of the light beam passing through the scrolling unit 110 to an original width.

Figure 8:
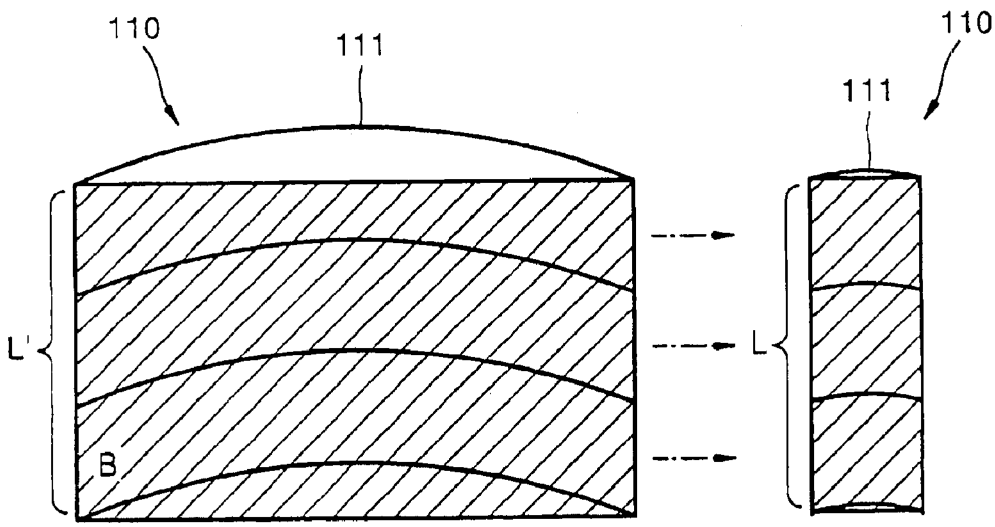
FIG. 8 is a diagram to compare a width of a light beam that is emitted from a light source and incident on a scrolling unit without passing through a first cylinder lens.

Referring to FIG. 8, the light beam that is emitted from the light source 100 and incident on the scrolling unit 110 without passing through the first cylinder lens 105 is compared to the light beam that has the width reduced by the first cylinder lens 105 and then is incident on the scrolling unit 110.

As shown in a left portion of FIG. 8, when the width of a light beam L' that is emitted from the light source 100 and incident on the scrolling unit 110 without passing through the first cylinder lens 105 is relatively wide, the shape of the light beam L' does not match that of the lens cells 111 due to the spiral shape of the lens cells 111 of the scrolling unit 110, and thus, light loss occurs.

As shown in a right portion of FIG. 8, when the width of the light beam is reduced using the first cylinder lens 105, the light beam L with the reduced width passes through the scrolling unit 110 so that a shape of the light beam L nearly matches the spiral shape of the lens cells 111 of the scrolling unit 110, thereby reducing the light loss.

As described above, because the width of the light beam can be adjusted using the two cylinder lenses 105 and 107, the light loss can be reduced.

As described above, because a single-panel color image display apparatus, according to an aspect of the present invention, includes a colored light separator of a reflective type which has four or more dichroic filters, a wide color gamut can be realized.

Further, because the single-panel color image display apparatus, according to an aspect of the present invention, performs color scrolling using a scrolling unit having a spiral array of lens cells, the same resolution can be obtained compared to a color wheel method and a high light efficiency can be achieved as in a three-panel color image display apparatus.

In addition, because a single-panel color image display apparatus, according to an aspect of the present invention, includes a scrolling unit in order to perform color scrolling, the single-panel color image display apparatus includes a small optical system of a simple structure, thereby reducing manufacturing costs. Further, continuity and consistency of the color scrolling can be guaranteed, and the scrolling speed of color bars can be kept constant.

While the present invention has been particularly shown and described with reference to aspects thereof, it will be understood by those of ordinary skill in the art that various changes in form and details may be made therein without departing from the spirit and scope of the present invention as defined by the appended claims.

What is claimed is:

1. A single-panel color image display apparatus, comprising:

a light source emitting a light;

four dichroic filters of a reflective type;

a colored light separator comprising the four or more dichroic filters to separate the light into color light beams according to a wavelength; and a light valve controlling the light on a pixel-by-pixel basis according to an input image signal and forming a color image.

2. The single-panel color image display apparatus of claim 1, wherein the colored light separator comprises four dichroic filters which reflect a red light beam, a green light beam, a cyan light beam, and a blue light beam.

3. The single-panel color image display apparatus of claim 2, wherein one of the dichroic filters reflecting the red light beam is disposed last among the other dichroic filters of the colored light separator.

4. The single-panel color image display apparatus of claim 2, further comprising:

a scrolling unit formed by spirally arranging an array of lens cells in a linear motion of a lens array due to a rotation of the spiral array of the lens cells to perform a scrolling operation, comprising sending the color light beams to different locations of the scrolling unit through the light valve and forming color bars, which are moved at a constant speed to form the color image.

5. The single-panel color image display apparatus of claim 1, wherein the colored light separator comprises five dichroic filters which reflect a red light beam, a yellow light beam, a green light beam, a cyan light beam, and a blue light beam.

6. The single-panel color image display apparatus of claim 5, wherein one of the dichroic filters reflecting the red light beam is disposed last among the other dichroic filters of the colored light separator.

7. The single-panel color image display apparatus of claim 5, further comprising:

a scrolling unit formed by spirally arranging an array of lens cells to obtain an effect of a linear motion of a lens array due to a rotation of the spiral array of the lens cells to perform a scrolling operation.

8. The single-panel color image display apparatus of claim 1, wherein one of the dichroic filters reflecting a red light beam is disposed last among the other dichroic filters of the colored light separator.

9. The single-panel color image display apparatus of claim 8, further comprising:

a scrolling unit formed by spirally arranging an array of lens cells in a linear motion of a lens array due to a rotation of the spiral array of the lens cells to perform a scrolling operation, comprising sending the color light beams to different locations of the scrolling unit through the light valve and forming color bars, which are moved at a constant speed to form the color image.

10. The single-panel color image display apparatus of claim 1, further comprising:

a scrolling unit formed by spirally arranging an array of lens cells in a linear motion of a lens array due to a rotation of the spiral array of the lens cells to perform a scrolling operation, comprising sending the color light beams to different locations of the scrolling unit through the light valve and forming color bars, which are moved at a constant speed to form the color image.

11. The single-panel color image display apparatus of claim 10, wherein the scrolling unit is disposed between the light source and the colored light separator.

12. The single-panel color image display apparatus of claim 10, further comprising:

first and second fly eye lenses, disposed between the scrolling unit and the light valve, sending the light passing through the scrolling unit to match the lens cells of the scrolling unit in a one-to-one correspondence.

13. The single-panel color image display apparatus of claim 12, further comprising:

a relay lens, disposed between the second fly eye lens and the light valve, condensing the light passing through the second fly eye lens on the light valve according to color.

14. The single-panel color image display apparatus of claim 10, further comprising: first and second cylinder lenses, disposed in front and behind of the scrolling unit, respectively, adjusting a width of the light incident on the scrolling unit.

* * * * *